(12) United States Patent
Urata et al.

(10) Patent No.: US 11,722,493 B2
(45) Date of Patent: Aug. 8, 2023

(54) ACCESS ANALYSIS SYSTEM AND ACCESS ANALYSIS METHOD

(71) Applicant: Nippon Telegraph and Telephone Corporation, Tokyo (JP)

(72) Inventors: Yusuke Urata, Musashino (JP); Nobuya Shirai, Musashino (JP); Yoshiko Sueda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 426 days.

(21) Appl. No.: 16/969,263

(22) PCT Filed: Feb. 7, 2019

(86) PCT No.: PCT/JP2019/004453
§ 371 (c)(1),
(2) Date: Aug. 12, 2020

(87) PCT Pub. No.: WO2019/159809
PCT Pub. Date: Aug. 22, 2019

(65) Prior Publication Data
US 2021/0006565 A1    Jan. 7, 2021

(30) Foreign Application Priority Data
Feb. 16, 2018 (JP) .................. 2018-026324

(51) Int. Cl.
*H04L 9/40* (2022.01)
*H04L 41/14* (2022.01)
*G06F 21/31* (2013.01)

(52) U.S. Cl.
CPC ............ *H04L 63/105* (2013.01); *H04L 41/14* (2013.01); *H04L 63/1425* (2013.01); *H04L 63/1483* (2013.01)

(58) Field of Classification Search
CPC ... H04L 63/105; H04L 41/14; H04L 63/1425; H04L 63/1483; H04L 63/1408; H04L 63/1433; H04L 67/535; H04W 12/08
See application file for complete search history.

(56) References Cited

U.S. PATENT DOCUMENTS 8,424,072 B2 * 4/2013 Pullikottil ........... H04L 63/1425
                                                                        709/224
10,015,182 B1 * 7/2018 Shintre .................. H04L 63/10
(Continued)

OTHER PUBLICATIONS

Liu et al., "An Anomaly Detector Deployment Awareness Detection Framework Based on Multi-Dimensional Resources Balancing in Cloud Platform," IEEE Access Year: 2018 | vol. 6 | Journal Article | Publisher: IEEE.*

(Continued)

*Primary Examiner* — Roderick Tolentino
(74) *Attorney, Agent, or Firm* — Fish & Richardson P.C.

(57) ABSTRACT

An access analysis system includes: a first analysis unit that analyzes validity of a user based on a characteristic of an operation of a terminal by the user regarding access via a network; a second analysis unit that based on communication regarding the access, analyzes normality of the communication; and a determination unit that determines validity of the access based on an analysis result from the first analysis unit and an analysis result from the second analysis unit, thereby improving the accuracy of determining the validity of access via the network.

18 Claims, 5 Drawing Sheets

(56) References Cited

U.S. PATENT DOCUMENTS

| | | | | |
|---|---|---|---|---|
| 10,129,195 | B1* | 11/2018 | Jakobsson | G06Q 10/107 |
| 10,193,772 | B1* | 1/2019 | Tjew | H04L 43/045 |
| 10,599,501 | B2* | 3/2020 | Yoshida | G06F 16/285 |
| 2013/0239191 | A1 | 9/2013 | Bostick | |
| 2016/0078365 | A1* | 3/2016 | Baumard | G06N 5/02 |
| | | | | 706/12 |
| 2018/0234443 | A1* | 8/2018 | Wolkov | H04L 67/535 |
| 2019/0081967 | A1* | 3/2019 | Balabine | H04L 67/535 |
| 2019/0188121 | A1* | 6/2019 | Simon | G06Q 20/0855 |
| 2019/0197549 | A1* | 6/2019 | Sharma | G06N 3/045 |

OTHER PUBLICATIONS

Wang et al., "Using Intuitionistic Fuzzy Set for Anomaly Detection of Network Traffic From Flow Interaction," IEEE Access Year: 2018 | vol. 6 | Journal Article | Publisher: IEEE.*

Matsubara et al., "Keyboard Dependency of Personal Identification Performance by Keystroke Dynamics in Free Text Typing," Journal of Information Security, Jun. 2015, 6:229-240.

Yamauchi et al., "Evaluation of Machine Learning Techniques for c & c Traffic Classification," Journal of the Information Processing Society of Japan, Sep. 2015, 56(9)-1745-1753, 21 pages (with English Translation).

\* cited by examiner

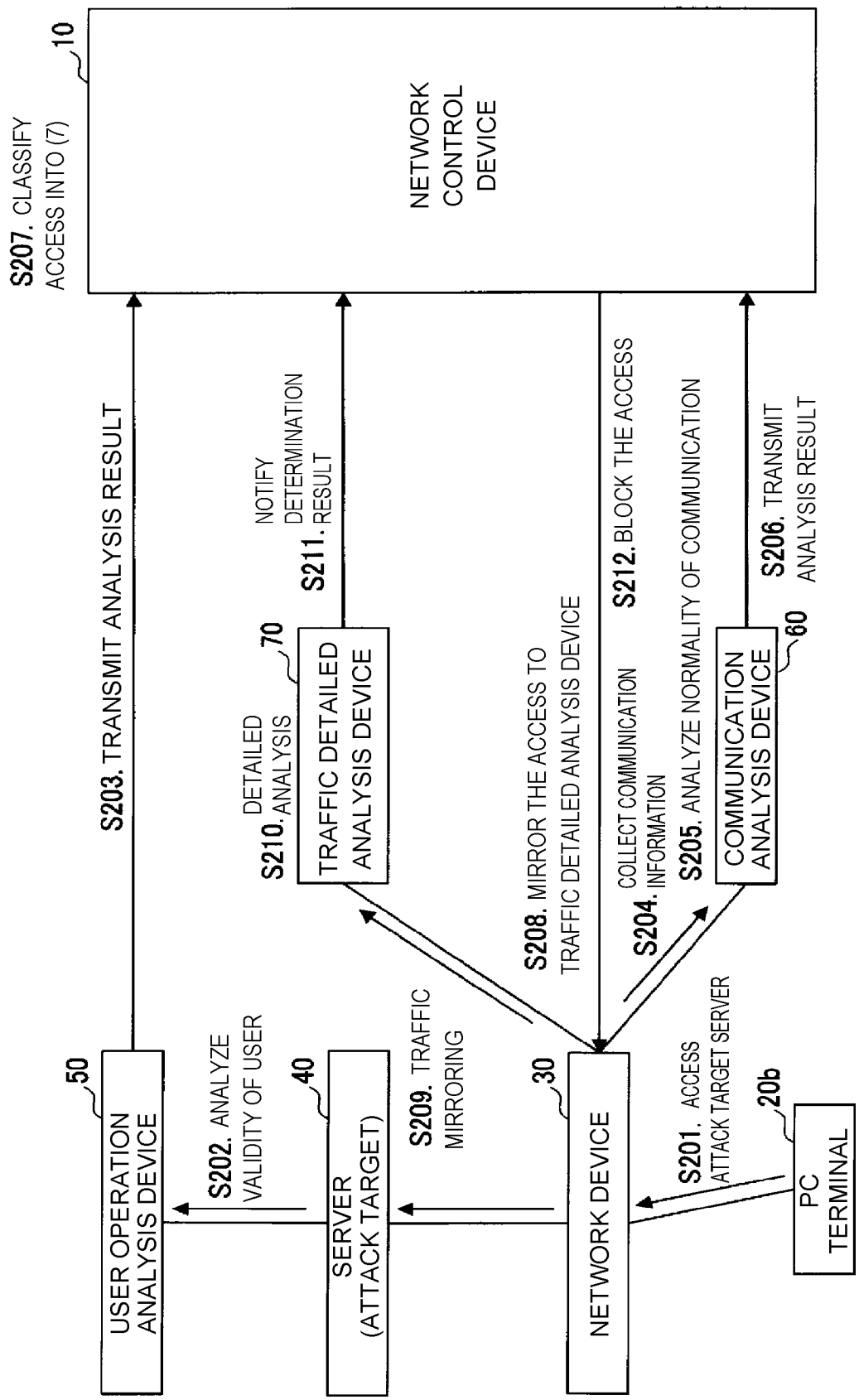

ACCESS ANALYSIS SYSTEM AND ACCESS ANALYSIS METHOD

CROSS-REFERENCE TO RELATED APPLICATIONS

This application is a National Stage application under 35 U.S.C. § 371 of International Application No. PCT/JP2019/004453, having an International Filing Date of Feb. 7, 2019, which claims priority to Japanese Application Serial No. 2018-026324, filed on Feb. 16, 2018. The disclosure of the prior application is considered part of the disclosure of this application, and is incorporated in its entirety into this application.

TECHNICAL FIELD

The present invention relates to an access analysis system and an access analysis method.

BACKGROUND ART

The average annual amount of damage due to unauthorized access, which is a type of cyber attack, has been an enormous amount as compared to cyber attacks other than unauthorized access. One type of unauthorized access is "spoofing" in which, for example, an unauthorized accessor takes over a third party's login information such as an ID/password to access important information, but it is extremely difficult to prevent unauthorized access by a person who has obtained the identification code of another person for the purpose of unauthorized access in this manner. In addition to spoofing, there is also much damage due to unauthorized access approaches that attack Web servers and the like by "abnormal communication" such as SQL injection and OS injection.

Although existing personal authentication techniques against unauthorized access include authentication using information that only the user him/herself can know such as an ID/password or a secret question (knowledge authentication) and authentication using information owned only by the user him/herself such as an IC card or a digital certificate (possession authentication), spoofing is easily performed when those pieces of information are stolen by a third party. In addition, since authentication based on physical characteristics (biometric authentication) such as fingerprint authentication and iris authentication is a method of quantifying physical characteristics of a user read by equipment or the like and comparing them with a pre-registered numerical value, it is possible to impersonate a registered user by eavesdropping on the numerical value in advance and transmitting the numerical value to the server. In the case of being impersonated by a third party, these conventional techniques always determine that this is normal even though someone other than the legitimate user is authenticated, so it is difficult to find spoofing.

In addition, existing abnormal communication detection techniques against unauthorized access include techniques for monitoring behavior of a network to detect unusual behavior such as IDS (intrusion detection system) and IPS (intrusion prevention system). In IDS and IPS, the statistics of the number of packets flowing through the network and the protocol usage are used for a normal state, and communication deviating from the preset normal state is always regarded as abnormal, so it is difficult to detect abnormal communication with high accuracy.

On the other hand, the latest personal authentication techniques against unauthorized access include a technique (behavioral biometrics technique/password free technique) for performing user authentication based on user behavior information such as a mouse operation and keyboard operation on a PC terminal, and a swipe operation on a smartphone (Non-Patent Literature 1). Since these techniques use, as an authentication element, information that is difficult for a third party to accurately simulate such as "user behavior", it is difficult for a third party to impersonate the legitimate user as compared to the above techniques. In addition, in the case of access by someone other than the legitimate user, it is determined that the someone is other than the legitimate user based on a difference in the behavior, so that it is easier to find spoofing than the conventional techniques.

The latest abnormal communication detection techniques against unauthorized access include a technique for analyzing network traffic to detect abnormal communication (UEBA (user and entity behavior analytics) technique). The UEBA technique can detect abnormal communication with higher accuracy by adding machine learning to conventional techniques such as IDS and IPS.

CITATION LIST

Non-Patent Literature

Non-Patent Literature 1: Yoshitomo Matsubara et al., "Keyboard Dependency of Personal Identification Performance by Keystroke Dynamics in Free Text Typing", Journal of Information Security, 2015, 6, 229-240.

Non-Patent Literature 2: Yamauchi Kazumasa et al., "Evaluation of Machine Learning Techniques for C&C Traffic Classification", Transactions of Information Processing Society of Japan, Vol. 56, No. 9, 1745-1753, September 2015.

SUMMARY OF THE INVENTION

Technical Problem

However, the behavioral biometrics technique/password free technique have an advantage that it is easier to find spoofing than the conventional techniques, but when the terminal is used in an unusual way, it may be erroneously recognized that the terminal is used by someone other than the legitimate user, so it is difficult to accurately discriminate between the legitimate user and someone other than the legitimate user.

In addition, although the UEBA technique can detect abnormal communication with higher accuracy than the conventional techniques, it may erroneously recognize communication deviating from the steady state as abnormal communication despite the normal communication, so it is difficult to accurately determine whether the communication is normal or abnormal.

The present invention has been made in view of the above points, and aims at improving the accuracy of determining the validity of access via a network.

Means for Solving the Problem

Therefore, in order to solve the above problem, an access analysis system includes: a first analysis unit that analyzes validity of a user based on a characteristic of an operation of a terminal by the user regarding access via a network; a second analysis unit that based on communication regarding the access, analyzes normality of the communication; and a determination unit that determines validity of the access based on an analysis result from the first analysis unit and an analysis result from the second analysis unit.

Effects of the Invention

It is possible to improve the accuracy of determining the validity of access via a network.

BRIEF DESCRIPTION OF DRAWINGS

FIG. 5 is a diagram for explaining an example processing procedure executed by the access analysis system.

DETAILED DESCRIPTION OF THE INVENTION

Figure 1:
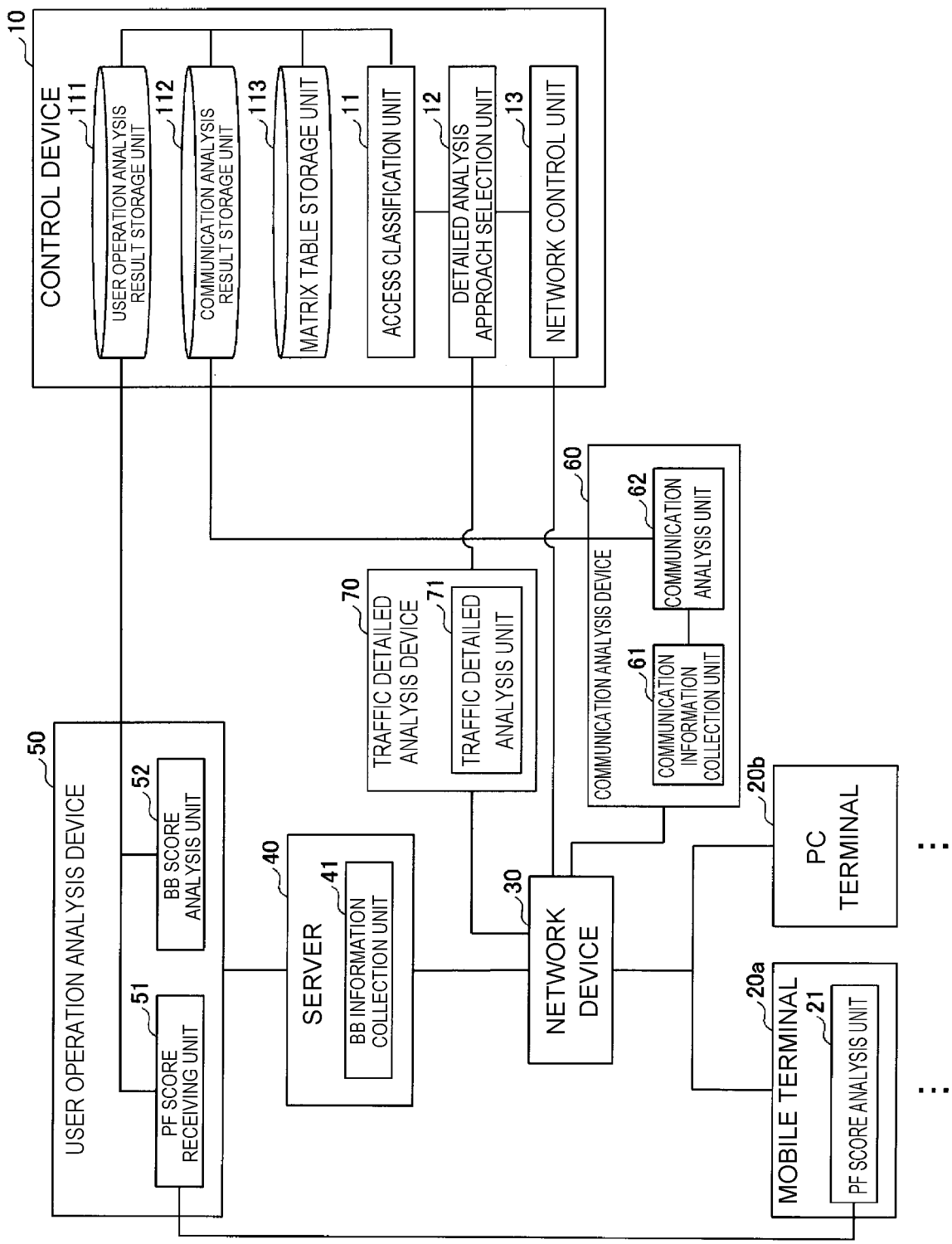
FIG. 1 is a diagram showing an example configuration of an access analysis system in an embodiment of the present invention.

An embodiment of the present invention will be described below based on the drawings. FIG. 1 is a diagram showing an example configuration of an access analysis system in the embodiment of the present invention. In FIG. 1, the access analysis system includes one or more mobile terminals 20a, one or more PC terminals 20b, one or more network devices 30, a server 40, a user operation analysis device 50, a communication analysis device 60, a network control device 10, a traffic detailed analysis device 70, and the like.

The network devices 30 are connected to the mobile terminals 20a, the PC terminals 20b, the server 40, the communication analysis device 60, the traffic detailed analysis device 70, and the network control device 10 via a network. The user operation analysis device 50 is connected to the mobile terminals 20a, the server 40, and the network control device 10 via the network. The communication analysis device 60 and the traffic detailed analysis device 70 are connected to the network control device 10 via the network.

A mobile terminal 20a and a PC terminal 20b are terminals used by a user. However, the validity of the user is not guaranteed. Note that the mobile terminal 20a is, for example, a smartphone or a tablet terminal.

The mobile terminal 20a has a PF score analysis unit 21. For each access to the server 40, the PF score analysis unit 21 analyzes a user operation related to the access based on the password free technique (hereinafter referred to as the "PF technique"), and calculates a score related to the validity of the user of the mobile terminal 20a (a score based on the PF technique). The PF score analysis unit 21 transmits the score to the user operation analysis device 50. Access to the server 40 is, for example, communication in units of requests to the server 40.

Note that since the PF technique is a technique corresponding to the mobile terminal 20a, the PC terminal 20b does not have the PF score analysis unit 21.

A network device 30 is, for example, a router. That is, the network device 30 is a device for transferring information distributed over the network to a route corresponding to the destination.

The server 40 is one or more computers, such as a Web server, that provide some service to users. The server 40 has a BB information collection unit 41 in addition to a functional unit for providing the service. The BB information collection unit 41 collects information (hereinafter referred to as "operation information") indicating a feature of an operation by a user on the PC terminal 20b that is performed in association with a Web page or the like provided by the server 40 to the PC terminal 20b. It is sufficient that the operation information is effective input information for the behavioral biometrics technique (hereinafter referred to as the "BB technique"). The operation information is hereinafter referred to as "BB information". The BB information collection unit 41 transmits BB information for each access to the server 40 to the user operation analysis device 50. Note that the server 40 can be an attack target for unauthorized access.

The user operation analysis device 50 is one or more computers having a PF score receiving unit 51 and a BB score analysis unit 52. The PF score receiving unit 51 receives the PF score from the mobile terminal 20a, and transmits the PF score to the network control device 10.

The BB score analysis unit 52 receives the BB information transmitted from the BB information collection unit 41 of the server 40, and analyzes the BB information using the BB technique to calculate a score (a score based on the BB technique) related to the validity of the user of the PC terminal 20b for each access to the server 40. The BB score analysis unit 52 transmits the score for each access to the network control device 10.

The communication analysis device 60 is one or more computers having a communication information collection unit 61, a communication analysis unit 62, and the like. The communication information collection unit 61 collects from the network device 30 communication information transferred by the network device 30 regarding communication for access to the server 40 by the mobile terminal 20a or the PC terminal 20b. The communication analysis unit 62 analyzes the communication information collected by the communication information collection unit 61 using the UEBA (user and entity behavior analytics) technique or the like to determine the normality of communication for each access to the server 40 by the mobile terminal 20a or the PC terminal 20b. The communication analysis unit 62 transmits to the network control device 10 information indicating the normality of communication (a normal range, a caution range, or an abnormal range) analyzed for each access.

The network control device 10 is one or more computers having an access classification unit 11, a detailed analysis approach selection unit 12, a network control unit 13, a user operation analysis result storage unit 111, a communication analysis result storage unit 112, a matrix table storage unit 113, and the like.

The user operation analysis result storage unit 111 stores a score transmitted from the PF score receiving unit 51 or the BB score analysis unit 52 of the user operation analysis device 50. That is, the user operation analysis result storage unit 111 stores, for each access to the server 40, a score related to the validity of the user that is calculated for the access.

The communication analysis result storage unit 112 stores an analysis result transmitted from the communication analysis unit 62 of the communication analysis device 60. That is, the communication analysis result storage unit 112 stores, for each access to the server 40, an analysis result (the normal range, the caution range, or the abnormal range) for the access by the communication analysis unit 62.

Whether access to the server 40 is authorized access or unauthorized access depends on a combination of the level of validity of the user and the level of validity of communication. The matrix table storage unit 113 stores a matrix table that is a table for clarifying a range in which it is possible to determine whether the access is authorized or unauthorized, and an indeterminable range according to the combination.

Figure 2:
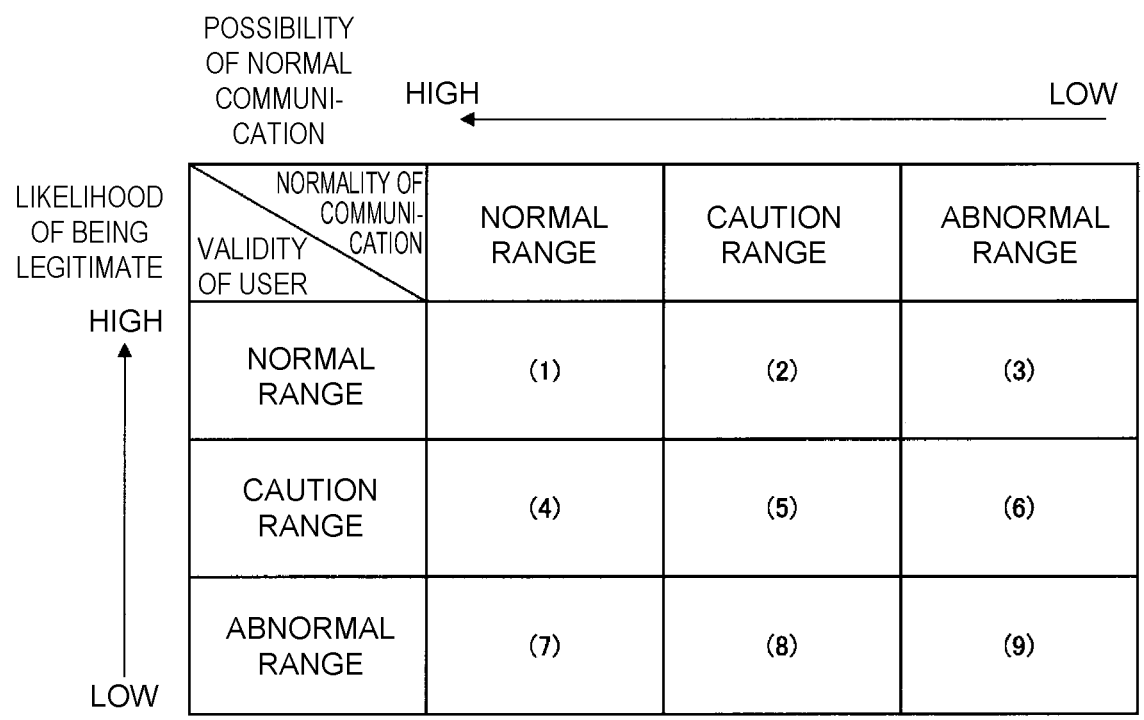
FIG. 2 is a diagram showing an example configuration of a matrix table.

FIG. 2 is a diagram showing an example configuration of the matrix table. In FIG. 2, the matrix table is assigned the level of normality of communication in the column direction, and assigned the level of validity of a user (likelihood that a user is the legitimate user) in the row direction.

That is, the column direction is classified into three levels: the normal range, the caution range, and the abnormal range (three stages) regarding the normality of communication for the access, and the row direction is classified into three levels: the normal range, the caution range, and the abnormal range (three stages) regarding the validity of the user for the access. The value of each element in the matrix table is a value of (1) to (9) depending on the combination of the level of normality of communication and the level of validity of the user. Each of (1) to (9) has the following meaning:
(1) "The legitimate user" and "normal communication"
(2) "The legitimate user" and "normal or abnormal communication"
(3) "The legitimate user" and "abnormal communication"
(4) "The legitimate user or an illegitimate user" and "normal communication"
(5) "The legitimate user or an illegitimate user" and "normal or abnormal communication"
(6) "The legitimate user or an illegitimate user" and "abnormal communication"
(7) "An illegitimate user" and "normal communication"
(8) "An illegitimate user" and "normal or abnormal communication"
(9) "An illegitimate user" and "abnormal communication"
Here, (1) is authorized access, (9) is unauthorized access, and (2) to (8) are ranges of access where it cannot be determined whether the access is authorized or unauthorized.

Note that in taxonomy, classification using a 2×2 matrix of "is" and "is not" (in the example of this embodiment, classification using "is the legitimate user" or "is an illegitimate user" and "is normal communication" or "is not normal communication" is most effective in analysis, but it is difficult for well-known security techniques to discriminate among them, so an area of indiscriminable access is provided to form a 3×3 matrix.

The access classification unit 11 applies the following analysis result for each access to the matrix table (FIG. 2) stored in the matrix table storage unit 113 to classify the validity of the access into (1)-(9) (i.e., determine the validity of the access):
(a) an analysis result (score) on the validity of the user stored in the user operation analysis result storage unit 111 regarding the access; and
(b) an analysis result on the normality of communication stored in the communication analysis result storage unit 112 regarding the access. Specifically, based on two thresholds for the score related to the validity of the user (a first threshold for separating the normal range and the caution range, and a second threshold for separating the caution range and the abnormal range), the access classification unit 11 classifies the score into the normal range, the caution range, or the abnormal range. In addition, the access classification unit 11 directly applies the analysis result on the normality of communication (the normal range, the caution range, or the abnormal range) to the normal range, the caution range, or the abnormal range of the matrix table.

Note that it is distinguished whether each access is different or the same using a combination of identification information (e.g., IP address) of the mobile terminal 20a or the PC terminal 20b that is the access source (transmission source) and identification information (e.g., IP address) of the server 40 that is the access destination. Alternatively, it is possible to distinguish whether each access is different or the same using the 5-tuple in TCP. Furthermore, it is possible to distinguish whether each access is different or the same in consideration of the identity of the content of the access (for example, the content of the request).

For access whose result of classification by the access classification unit 11 is one of (2) to (8) (that is, access that cannot be determined as authorized access or unauthorized access), the detailed analysis approach selection unit 12 selects an approach of detailed analysis for classifying the access into (1) or (9). The detailed analysis approach selection unit 12 then instructs the traffic detailed analysis device 70 or the like to execute the selected approach.

The network control unit 13 controls (e.g., blocks) communication related to access classified into (9) by the access classification unit 11 or access determined to fall under (9) through execution of the approach selected by the detailed analysis approach selection unit 12.

The traffic detailed analysis device 70 is one or more computers having a traffic detailed analysis unit 71. The traffic detailed analysis unit 71 performs detailed analysis on, for example, communication related to access specified by the detailed analysis approach selection unit 12. For example, the simple analysis UEBA technique analyzes a header portion of a packet, while the traffic detailed analysis unit 71 performs analysis or the like on a payload portion of the packet to analyze the presence or absence of unauthorized information in the access, for example.

Figure 3:
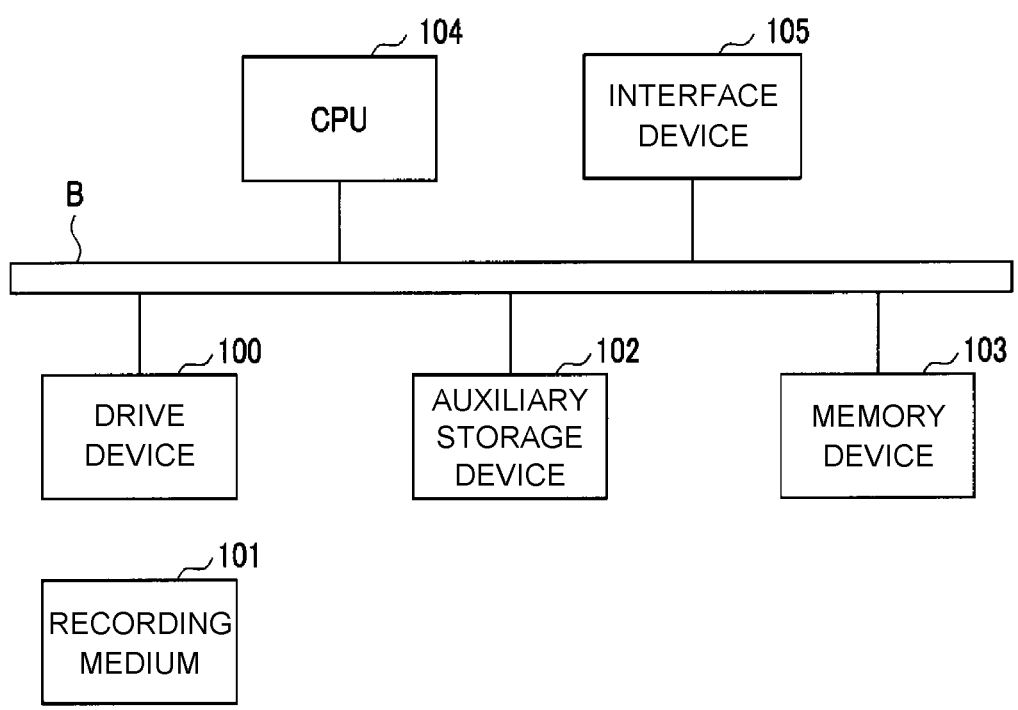
FIG. 3 is a diagram showing an example hardware configuration of a network control device 10 in the embodiment of the present invention.

FIG. 3 is a diagram showing an example hardware configuration of the network control device 10 in the embodiment of the present invention. The network control device 10 in FIG. 3 has a drive device 100, an auxiliary storage device 102, a memory device 103, a CPU 104, an interface device 105, and the like that are connected to each other via a bus B.

A program for implementing the processing in the network control device 10 is provided via a recording medium 101 such as a CD-ROM. When the recording medium 101 storing the program is set in the drive device 100, the program is installed in the auxiliary storage device 102 from the recording medium 101 via the drive device 100. However, the program need not necessarily be installed from the recording medium 101, and may be downloaded from another computer via the network. The auxiliary storage device 102 stores the installed program as well as necessary files, data, and the like.

When instructed to run the program, the memory device 103 reads out the program from the auxiliary storage device 102 for storage. The CPU 104 executes functions related to the network control device 10 according to the program stored in the memory device 103. The interface device 105 is used as an interface for connecting to the network.

Note that each device other than the network control device 10 may also have a hardware configuration as shown in FIG. 3.

The access classification unit 11, the detailed analysis approach selection unit 12, and the network control unit 13 of the network control device 10 in FIG. 1 are implemented by the processing that one or more programs installed in the network control device 10 cause the CPU 104 to execute. The user operation analysis result storage unit 111, the communication analysis result storage unit 112, and the matrix table storage unit 113 can be implemented using, for example, the auxiliary storage device 102, or a storage device connectable to the network control device 10 via the network.

The PF score analysis unit 21, the BB information collection unit 41, the PF score receiving unit 51, the BB score analysis unit 52, the communication information collection unit 61, the communication analysis unit 62, the traffic detailed analysis unit 71, and the like in FIG. 1 are implemented by the processing that one or more programs installed in a device having each unit cause the CPU of the device to execute.

Figure 4:
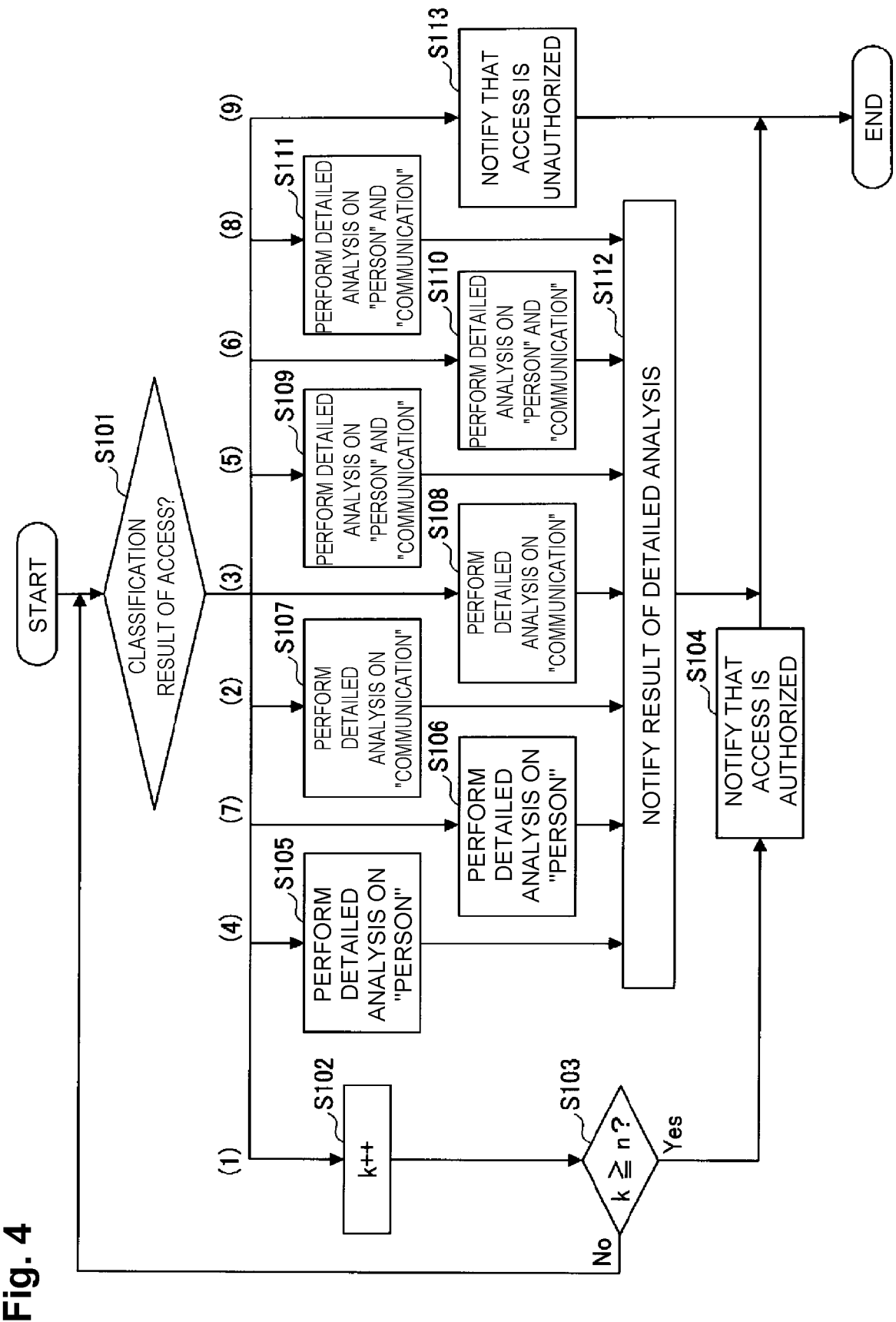
FIG. 4 is a flowchart for explaining an example processing procedure executed by a traffic detailed analysis unit 71.

A processing procedure executed in the access analysis system will be described below. FIG. 4 is a flowchart for explaining an example processing procedure executed by the traffic detailed analysis unit 71. In FIG. 4, it is assumed that a certain specific access (hereinafter referred to as a "target access").) is to be processed.

In step S101, the traffic detailed analysis unit 71 branches the processing based on a classification result of the target access by the access classification unit 11. Note that the classification result is information indicating one of (1) to (9) in the matrix table (FIG. 2).

When the classification result is (1), the traffic detailed analysis unit 71 adds 1 to a variable k corresponding to the target access (S102). The variable k is a variable that is prepared for each access and has an initial value of 0. Subsequently, the traffic detailed analysis unit 71 determines whether or not the value of the variable k is equal to or larger than a threshold n (S103). When the value of the variable k is smaller than the threshold n (No in S103), a return is made to step S101. That is, in this case, the traffic detailed analysis unit 71 executes the processing based on a classification result of a new access that is the same as the target access. When the value of the variable k is equal to or larger than the threshold n (Yes in S103), the traffic detailed analysis unit 71 notifies the network control unit 13 that the target access is authorized access (S104).

When the classification result is (4) or (7), the traffic detailed analysis unit 71 performs detailed analysis on the validity of the "person (user)" (S105, S106). The content of the detailed analysis is not limited to a predetermined one. For example, regarding the target access, the analysis by the PF score analysis unit 21 or the BB score analysis unit 52 may be continued, or analysis may be performed by another method. As a result of such detailed analysis, the target access is determined to be either authorized access or unauthorized access.

When the classification result is (2) or (3), the traffic detailed analysis unit 71 performs detailed analysis on the normality of the communication (S107, S108). The content of the detailed analysis is not limited to a predetermined one. For example, the traffic detailed analysis unit 71 may be instructed to analyze the payload portion related to the target access. As a result of such detailed analysis, the target access is determined to be either authorized access or unauthorized access.

When the classification result is (5), (6), or (8), the traffic detailed analysis unit 71 performs detailed analysis on the validity of the "person (user)" and detailed analysis on the normality of the communication (S109, S110, S111). The content of the detailed analysis is not limited to a predetermined one. For example, step S105 or S106 and one of steps S107 to S109 may be combined for analysis. As a result of such detailed analysis, the target access is determined to be either authorized access or unauthorized access.

Subsequent to steps S105 to S111, the traffic detailed analysis unit 71 notifies the result of the detailed analysis to the network control unit 13 (S112).

When the classification result is (9), the traffic detailed analysis unit 71 notifies the network control unit 13 that the target access is unauthorized access (S113).

Note that the network control unit 13 transmits, for example, a blocking instruction to the network device 30 regarding access that is notified as unauthorized access from the traffic detailed analysis unit 71.

Next, a specific example of a processing procedure executed in the access analysis system will be described.

FIG. 5 is a diagram for explaining an example processing procedure executed in the access analysis system. In FIG. 5, it is assumed that the PC terminal 20*b* is an attack source, and is generating access in which malware is dropped on the payload portion of the packet addressed to the server 40. Accordingly, the server 40 is the attack target.

In step S201, the PC terminal 20*b* performs access to the server 40, with malware dropped on the payload portion of the packet (hereinafter referred to as "target access"). Note that at this time, operation information on the target access is collected by the BB information collection unit 41 of the server 40, and the collected operation information is transmitted to the BB score analysis unit 52 of the user operation analysis device 50.

In step S202, the BB score analysis unit 52 of the user operation analysis device 50 analyzes the validity of the user regarding the target access based on the operation information using the BB technique to calculate a score. The BB score analysis unit 52 transmits the score to the network control device 10 as a score related to the target access (S203). The score is stored in the user operation analysis result storage unit 111 in association with identification information of the target access.

On the other hand, in parallel with steps S202, S203, etc., the communication information collection unit 61 of the communication analysis device 60 collects communication information on the target access from the network device 30 (S204). The communication analysis unit 62 analyzes the communication information collected by the communication information collection unit 61 using the UEBA technique or the like to analyze the normality of the communication (S205), and transmits the analysis result to the network control device 10 (S206).

Subsequently, the access classification unit 11 of the network control device 10 applies the analysis result (score) of the validity of the user regarding the target access and the analysis result of the score of the normality of the communication regarding the target access to the matrix table (FIG. 2) to classify the target access into one of (1) to (9). Here, it is assumed to be classified into (7).

In response to the target access being classified into (7), the detailed analysis approach selection unit 12 implements settings for mirroring the target access to the traffic detailed analysis device 70 on the network device 30 (S208). As a result, traffic (communication) related to the target access is mirrored to the traffic detailed analysis device 70 (S209).

Subsequently, the traffic detailed analysis unit 71 of the traffic detailed analysis device 70 performs analysis or the like on the payload portion of a packet of the target access to detect that the payload portion contains malware (S210). Then, the traffic detailed analysis unit 71 determines that the target access is unauthorized access, and transmits the determination result to the detailed analysis approach selection unit 12 of the network control device 10 (S211). The network control unit 13 of the network control device 10 instructs the network device 30 to block the target access based on the determination result (S212).

Note that although an example of using the BB technique has been described above as a technique for determining the validity of a user, other techniques (e.g., knowledge authentication, possession authentication, biometric authentication, etc.) may be used.

Although an example of using the UEBA technique has been described above as a technique for determining the normality of communication, other techniques (e.g., IDS (intrusion detection system), IPS (intrusion prevention system), etc.) may be used.

However, by using the BB technique and the UEBA technique, it can be expected that the validity of access can be determined with high accuracy.

As described above, according to the present embodiment, it is determined whether access via the network is authorized access or not (validity) based on the validity of the user regarding the access and the normality of communication regarding the access. Accordingly, it is possible to improve the accuracy of determining the validity as compared with the case where the validity of the access is determined based only on the validity of the user or the normality of the communication.

Note that in the present embodiment, the BB score analysis unit 52 and the PF score analysis unit 21 are an example of the first analysis unit. The communication analysis unit 62 is an example of the second analysis unit. The access classification unit 11 is an example of the determination unit. The traffic detailed analysis unit 71 is an example of the third analysis unit.

Although the embodiment of the present invention has been described above in detail, the present invention is not limited to such a specific embodiment, and various variants and modifications may be made within the scope of the gist of the present invention described in Claims.

REFERENCE SIGNS LIST

10 network control device
11 access classification unit
12 detailed analysis approach selection unit
13 network control unit
20a mobile terminal
20b PC terminal
21 PF score analysis unit
30 network device
40 server
41 BB information collection unit
50 user operation analysis device
51 PF score receiving unit
52 BB score analysis unit
60 communication analysis device
61 communication information collection unit
62 communication analysis unit
70 traffic detailed analysis device
71 traffic detailed analysis unit
100 drive device
101 recording medium
102 auxiliary storage device
103 memory device
104 CPU
105 interface device
111 user operation analysis result storage unit
112 communication analysis result storage unit
113 matrix table storage unit
B bus

The invention claimed is:

1. An access analysis system comprising one or more processors and a memory configured to:
    detect one or more requests from a terminal to access a server over a network;
    analyze a first characteristic of the one or more requests;
    based on the analyzed first characteristic of the one or more requests, determine a first score indicative of a validity of a user at the terminal that transmitted the one or more requests to the server;
    analyze a second characteristic of the one or more requests;
    based on the analyzed second characteristic, determine data indicative of a normality of the one or more requests;
    in response, generate a second score based on (i) the first score and (ii) the data indicative of the normality of the one or more requests, the second score indicative of a classification of the validity of the terminal's access to the server, wherein the second score is generated by applying, to a matrix table, (i) the first score indicative of the validity of the user at the terminal that transmitted the one or more requests and (ii) the data indicative of the normality of the one or more requests, the matrix table showing validity of access via the network according to a combination of i) a level at which the user is valid and ii) a level at which the communication is normal; and
    in response to analyzing the second score, transmit a notification to a device that monitors communications with the server over the network, the notification indicating that the one or more requests from the terminal (i) are unauthorized and (ii) to block subsequent requests transmitted by the terminal to the server over the network.

2. The access analysis system according to claim 1, where the one or more processors are further configured to:
    perform additional analysis on communication related to access that cannot be determined to be authorized or unauthorized, wherein the additional analysis comprises:
    compare the second score to a first threshold; and
    determine the second score satisfies the first threshold.

3. The analysis system according to claim 1, wherein the one or more processors are configured to:
    compare the second score to a first threshold;
    in response to determining the second score does not satisfy the first threshold, compare the second score to a second threshold;
    determine the second score satisfies the second threshold;
    in response to determining the second score satisfies the second threshold, increment a counter corresponding to a target access;
    compare the incremented counter to a third threshold;
    determine the incremented counter satisfies the third threshold; and
    in response to determining the incremented counter satisfies the third threshold, transmit a second notification to the device that monitors the communications with the server over the network, the second notification indicating that the one or more requests from the terminal are authorized.

4. The analysis system according to claim 1, wherein the one or more processors are configured to:

compare the second score to a first threshold;
in response to determining the second score does not satisfy the first threshold, compare the second score to a fourth threshold;
determine the second score satisfies the fourth threshold;
in response to determining the second score satisfies the fourth threshold, analyze a payload portion of the one or more requests; and
in response to analyzing the payload portion of the one or more requests, determine whether to allow the terminal access to the server over the network.

5. The analysis system according to claim 1, wherein the one or more processors are configured to:
compare the second score to a first threshold;
in response to determining the second score does not satisfy the first threshold, compare the second score to a fifth threshold;
determine the second score satisfies the fifth threshold;
in response to determining the second score satisfies the fifth threshold, analyze the first characteristic and the second characteristic of the one or more requests; and
in response to analyzing the first characteristic and the second characteristic of the one or more requests, determine whether to allow the terminal access to the server over the network.

6. The analysis system according to claim 1, wherein the one or more processors:
compare the second score to a first threshold;
in response to determining the second score satisfies the first threshold, determine a presence of malware on a payload portion of the one or more requests.

7. The analysis system according to claim 1, wherein the one or more processors are configured to:
compare the second score to a first threshold;
in response to determining the second score does not satisfy the first threshold, compare the second score to a sixth threshold;
determine the second score satisfies the sixth threshold;
in response to determining the second score satisfies the sixth threshold, transmit a notification to the device, the notification instructing the device to: (i) act as a mirroring device for the server, (ii) intercept the one or more requests from the terminal over the network, (iii) analyze a payload portion of the one or more requests to detect a presence of malware, and (iv) to block subsequent requests transmitted by the terminal to the server over the network if the presence of malware is detected.

8. An access analysis method comprising:
detecting one or more requests from a terminal to access a server over a network;
analyzing a first characteristic of the one or more requests;
based on the analyzed first characteristic of the one or more requests, determining a first score indicative of a validity of a user at the terminal that transmitted the one or more requests to the server;
analyzing a second characteristic of the one or more requests;
based on the analyzed second characteristic, determining data indicative of a normality of the one or more requests;
in response, generating a second score based on (i) the first score and (ii) the data indicative of the normality of the one or more requests, the second score indicative of a classification of the validity of the terminal's access to the server, wherein the second is generated by applying, to a matrix table, (i) the first score indicative of the validity of the user at the terminal that transmitted the one or more requests and (ii) the data indicative of the normality of the one or more requests, the matrix table showing validity of access via the network according to a combination of i) a level at which the user is valid and ii) a level at which the communication is normal; and
in response to analyzing the second score, transmitting a notification to a device that monitors communications with the server over the network, the notification indicating that the one or more requests from the terminal (i) are unauthorized and (ii) to block subsequent requests transmitted by the terminal to the server over the network.

9. The access analysis method according to claim 8, further comprising:
performing additional analysis on communication related to access that cannot be determined to be authorized or unauthorized, wherein performing the additional analysis comprises:
comparing the second score to a first threshold; and
determining the second score satisfies the first threshold.

10. The access analysis method according to claim 8, wherein:
comparing the second score to a first threshold;
in response to determining the second score does not satisfy the first threshold, comparing the second score to a second threshold;
determining the second score satisfies the second threshold;
in response to determining the second score satisfies the second threshold, incrementing a counter corresponding to a target access;
comparing the incremented counter to a third threshold;
determining the incremented counter satisfies the third threshold; and
in response to determining the incremented counter satisfies the third threshold, transmitting a second notification to the device that monitors the communications with the server over the network, the second notification indicating that the one or more requests from the terminal are authorized.

11. The access analysis method according to claim 8, wherein:
comparing the second score to a first threshold;
in response to determining the second score does not satisfy the first threshold, comparing the second score to a fourth threshold;
determining the second score satisfies the fourth threshold;
in response to determining the second score satisfies the fourth threshold, analyzing a payload portion of the one or more requests; and
in response to analyzing the payload portion of the one or more requests, determining whether to allow the terminal access to the server over the network.

12. The access analysis method according to claim 8, wherein:
comparing the second score to a first threshold;
in response to determining the second score does not satisfy the first threshold, comparing the second score to a fifth threshold;
determining the second score satisfies the fifth threshold;
in response to determining the second score satisfies the fifth threshold, analyzing the first characteristic and the second characteristic of the one or more requests; and in response to analyzing the first characteristic and the second characteristic of the one or more requests, determining whether to allow the terminal access to the server over the network.

13. The access analysis method according to claim 8, wherein:
comparing the second score to a first threshold;
in response to determining the second score satisfies the first threshold, determining a presence of malware on a payload portion of the one or more requests.

14. The access analysis method according to claim 8, wherein:
comparing the second score to a first threshold;
in response to determining the second score does not satisfy the first threshold, comparing the second score to a sixth threshold;
determining the second score satisfies the sixth threshold;
in response to determining the second score satisfies the sixth threshold, transmitting a notification to the device, the notification instructing the device to: (i) act as a mirroring device for the server, (ii) intercept the one or more requests from the terminal over the network, (iii) analyze a payload portion of the at least one or more intercepted requests to detect a presence of malware, and (iv) to block subsequent requests transmitted by the terminal to the server over the network if the presence of malware is detected in the at least one or more intercepted requests.

15. A non-transitory computer-readable medium storing software comprising instructions executable by one or more computers which, upon such execution, cause the one or more computers to perform operations comprising:
detecting one or more requests from a terminal to access a server over a network;
analyzing a first characteristic of the one or more requests;
based on the analyzed first characteristic of the one or more requests, determining a first score indicative of a validity of a user at the terminal that transmitted the one or more requests to the server;
analyzing a second characteristic of the one or more requests;
based on the analyzed second characteristic, determining data indicative of a normality of the one or more requests;
in response, generating a second score based on (i) the first score and (ii) the data indicative of the normality of the one or more requests, the second score indicative of a classification of the validity of the terminal's access to the server, wherein the second is generated by applying, to a matrix table, (i) the first score indicative of the validity of the user at the terminal that transmitted the one or more requests and (ii) the data indicative of the normality of the one or more requests, the matrix table showing validity of access via the network according to a combination of i) a level at which the user is valid and ii) a level at which the communication is normal; and in response to analyzing the second score, transmitting a notification to a device that monitors communications with the server over the network, the notification indicating that the one or more requests from the terminal (i) are unauthorized and (ii) to block subsequent requests transmitted by the terminal to the server over the network.

16. The non-transitory computer readable medium according to claim 15, wherein:
comparing the second score to a first threshold;
in response to determining the second score does not satisfy the first threshold, comparing the second score to a second threshold;
determining the second score satisfies the second threshold;
in response to determining the second score satisfies the second threshold, incrementing a counter corresponding to a target access;
comparing the incremented counter to a third threshold;
determining the incremented counter satisfies the third threshold; and
in response to determining the incremented counter satisfies the third threshold, transmitting a second notification to the device that monitors the communications with the server over the network, the second notification indicating that the one or more requests from the terminal are authorized.

17. The non-transitory computer readable medium according to claim 15, wherein:
comparing the second score to a first threshold;
in response to determining the second score does not satisfy the first threshold, comparing the second score to a fourth threshold;
determining the second score satisfies the fourth threshold;
in response to determining the second score satisfies the fourth threshold, analyzing a payload portion of the one or more requests; and
in response to analyzing the payload portion of the one or more requests, determining whether to allow the terminal access to the server over the network.

18. The non-transitory computer readable medium according to claim 15, wherein:
comparing the second score to a first threshold;
in response to determining the second score does not satisfy the first threshold, comparing the second score to a fifth threshold;
determining the second score satisfies the fifth threshold;
in response to determining the second score satisfies the fifth threshold, analyzing the first characteristic and the second characteristic of the one or more requests; and
in response to analyzing the first characteristic and the second characteristic of the one or more requests, determining whether to allow the terminal access to the server over the network.

* * * * *